Figure 1:
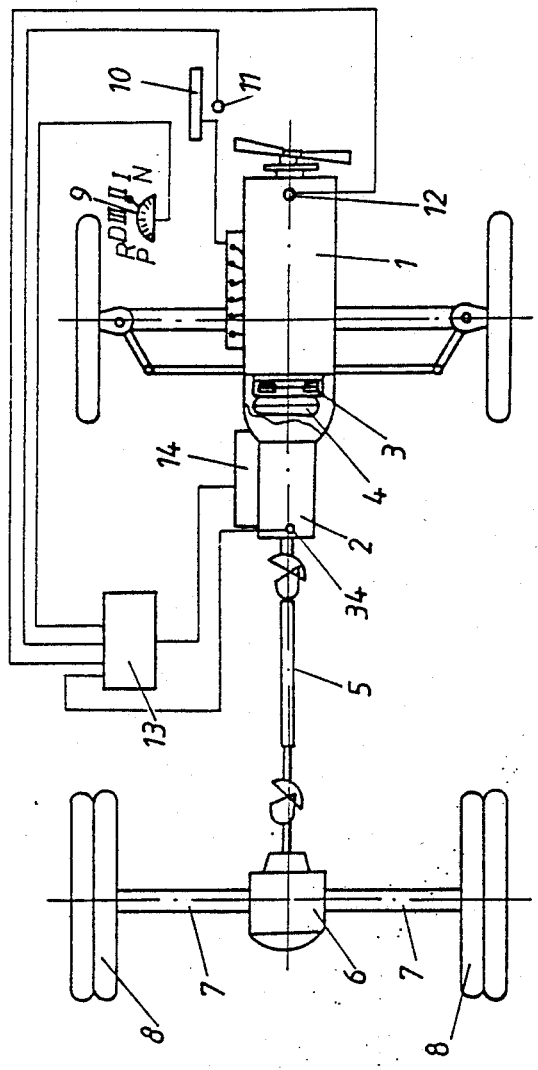

United States Patent [19]

Simonyi et al.

[11] Patent Number: 4,930,374

[45] Date of Patent: Jun. 5, 1990

[54] PROCESS FOR THE GEAR CHANGE OF AUTOMATIC OR SYNCHRONIZED MECHANIC TRANSMISSION OF MOTOR VEHICLES

[75] Inventors: Sándor Simonyi, Salgótarján; László Töröcsik, Budapest; György Válóczi, Salgótarján, all of Hungary

[73] Assignee: Csepel Autógyár, Szigetszentmiklós, Hungary

[21] Appl. No.: 252,654

[22] Filed: Oct. 3, 1988

[30] Foreign Application Priority Data

Oct. 14, 1987 [HU] Hungary .................... 2251-4627/87

[51] Int. Cl.$^5$ ............................................ B60K 41/06
[52] U.S. Cl. ..................................... 74/866; 74/336 R
[58] Field of Search ................... 74/866, 335 R, 336 R

[56] References Cited

U.S. PATENT DOCUMENTS

| | | | |
|---|---|---|---|
| 4,044,634 | 8/1977 | Florus et al. | 74/866 |
| 4,194,608 | 3/1980 | Usui et al. | 192/0.092 |
| 4,263,826 | 4/1981 | Hartz et al. | 74/868 |
| 4,463,427 | 7/1984 | Bonnetain et al. | 74/866 X |
| 4,539,868 | 9/1985 | Habu | 74/866 X |
| 4,539,869 | 10/1985 | Suga et al. | 74/866 |
| 4,566,354 | 1/1986 | Kumura et al. | 74/866 |
| 4,610,183 | 9/1986 | Nobumoto et al. | 74/866 |
| 4,662,247 | 5/1987 | Sotoyama et al. | 74/866 |
| 4,677,880 | 7/1987 | Hattori et al. | |
| 4,811,224 | 3/1989 | Kuerschner et al. | |

*Primary Examiner*—Dwight Diehl
*Attorney, Agent, or Firm*—Schweitzer & Cornman

[57] ABSTRACT

A process for effecting controlled gear change in a vehicle having a transmission capable of automated shifting. A control circuit is provided with memory functions storing values of torque available from the vehicle engine at various operative r.p.m. values and at various throttle positions. When the vehicle is in operation, throttle position is compared to the torque/throttle position memory to derive a signal representing available torque for the throttle position. Likewise, engine r.p.m. is compared to the related memory function to derive a signal representing the torque available at such r.p.m. These two available torque values are compared to derive a signal representing relative load on the engine. A further memory function stores predetermined comparative values of load level and r.p.m. at which shifting of the transmission should occur. When load level is below a predetermined value, and simultaneously the r.p.m. is above a predetermined value, an upshift of the transmission is called for. Downshifting of the transmission is called for whenever either the load value exceeds a predetermined comparative value or the r.p.m. value drops below a predetermined comparative value. Additional memory functions may be employed to store temporarily the conditions of the most recent downshift and using these conditions to modify the predetermined comparative values for the next subsequent upshift. This enables appropriate compensation to be made for the conditions that caused a downshift, e.g., normal deceleration of the vehicle, acceleration to overtake another vehicle, or increased loading by reason of ascending a grade.

6 Claims, 13 Drawing Sheets

PROCESS FOR THE GEAR CHANGE OF AUTOMATIC OR SYNCHRONIZED MECHANIC TRANSMISSION OF MOTOR VEHICLES

The invention relates to a process by the aid of which optimal values of the switching points of gear change of the transmission of a motor vehicle can be determined. The process can be equally used for automatic transmissions and automatically actuated mechanic transmissions.

It is a well known fact that both with automatic transmissions and automatically actuated mechanic transmissions decisions of the driver leading to gear change of traditional transmissions has to be completed with proper control.

Initially only one single value of changing-up or changing-back velocity used to be determined for the single gears. However, these controls were unable to consider either leading of the motor vehicle, or ascent or the intention of overtaking. Accordingly, several solutions have been developed for making control more sensitive.

As it becomes obvious from one of the articles of the periodical Avtomobilnaja promüslennoszty, 1986/2, with Soviet GMP automatic transmissions the loading range of the motor was divided in three sections. That means technically that stroke length of the gas control lever is divided into three sections and different point series of gear change are defined for each section. Essentially a similar solution is described in the Patent U.S. Pat. No. 4,468,987. In this case too conclusion is drawn from the position of the throttle pedal in respect to load, while a series of points of switching were defined for the unloaded, loaded and braking state. However, these solutions are not able to consider properly the intention of the driver to accelerate the vehicle.

The solution according to the U.S. Pat. No.4 414 863 represents already a more complete arrangement. With this system in addition to the separation of loading sections gear change is made softer by delayed switching. A further advantage lies in that a prohibiting programme is provided for acceleration, which hinders changing-back after having already changed-up in course of acceleration. In this case "full extension" of the motor is achieved.

The solution according to the German Patent No DE-PS 15 80 611 considers loading in a quite different way. In this case electric signals are formed from the position of the throttle pedal and velocity, these are added and on basis of the sum obtained the system selects the proper series of points of gear change.

With these systems it has been tried to approach ideal way of driving so, that more and more series of points of gear change were determined. The German Patent Specification DE-OS No 27 56 719 gives an example for a solution which was developed for earthwork-machines. Special series of points of gear change are determined for the operation on highways and work performance.

Similar solutions are disclosed in the German Patent Specifications DE-PS Nos 19 58 944 and DE-PS 24 25 607 as well as in U.S. Pat. No 4,263,826. A most interesting feature of the lastmentioned lies in that complete control is realized hydraulically and load is examined on basis of number of revolutions of the motor. The German Patent Specification DE-PS No 19 54 783 gives a solution for further possibilities of correction. With this solution the driver may increase the automatically selected points of gear change by means of a change-over switch if, after having left the hill (ascent), he is of the opinion that the gear selected by the control is too high.

According to the solution as specified in the German Patent DE-PS No 20 13 079, the driver may influence control during the ascent, at the same time the control itself is also considering certain changes in traffic conditions, so e.g. the detector examines the angle of slope, acceleration of the vehicle and curvature of the bend.

With the solution according to the U.S. Pat. No 4,044,634 a detector is measuring acceleration of the vehicle, in case of a more intense acceleration the control does not change up to a higher gear. This control results also in "full extension" of the motor.

Accordingly, the requirement arose to complete motor vehicles provided with mechanic transmission with complementary means for making it more suitable for less skillful persons or for those who are not capable for manipulating pedals and transmission in a proper way.

U.S Pat. No. 4,194,608 discloses a solution which is aimed at the solution of the previously mentioned task. Gear-change of the mechanic synchronized transmission is controlled by the most modern selection of the switching points. As number of revolutions of the crankshaft of the motor and driving shaft of the transmission are different after changing-up, asynchronism is eliminated so, that otherwise automatized-closing of the clutch is delayed and meanwhile number of revolutions of the motor is re-regulated. This system is rather over-complicated, far more basic informations are needed than usual, so e.g. the signal of the basic run of the motor, full detection of the stroke of the clutch is imperative, deceleration and angle of slope are to be measured. The solution according to the British Patent GB-PS No 2,119,460 is based on the same principle, however, this solution is far simpler.

As it becomes obvious from the survey of the different tendencies of development, up to now it has not yet succeeded to determine the optimal points of gear change. For solving the resulting problems better or worse substituting solutions were proposed. However, even the best solutions require special command for changing or completely eliminating general control programmes under special conditions (ascent, overtaking).

The aim of the invention lies in to find the solution for the optimal control by the aid of which ideal points of gear change can be determined to every condition of loading, that means ideal points of gear change which could be determined by the driver in course of manual gear change.

Our endeavour was to provide for a solution which can be equally used for an automatic transmission and to a mechanic synchronized transmission as well.

The solution is based on the recognition, in so far as neither the position of the throttle pedal nor the extent of throttling— as used as basic signal for the control up to now— express accurately the real state of loading.

As. it is namely well know, in addition to aforementioned capacity of the motor depends also on prevailing number of revolutions, and what is even more important, none of the functions is linear. That means that by the simultaneous analysis of throttling and torque, as well as number of revolutions and torque or the functions thereof actual prevailing load can be always determined. A further recognition lies in that if changes in load and causes are continuously analyzed, points of switching are to be displaced to the necessary extent only, for this purpose analysis of number of revolutions suffices.

Accordingly, the invention relates to a process for the gear-change of automatic or automatized mechanic synchronized transmission of motor vehicles, in the drive chain of which an automatic transmission is driven by an internal combustion motor through the hydrodynamic torque converter built therein or optionally through a short-circuiting dry friction clutch, or an automatized mechanic synchronized transmission is driven through a dry friction clutch, directly with the transmission and/or through the cardan shaft, whereafter by the aid of at least one differential gear and the half-axes connected thereto at least one pair of wheels of the motor vehicle is put in rotary motion, while the gear change of the transmission (including actuation of the dry friction clutch and optionally the actuation of the hydrodynamic torque converter) is performed by the aid of gear changing means, expendiently by the auxiliary energy controlled by electromagnetic valves.

The process according to the invention is realized so, in so far as we determine the function between the torque of the motor and the position of the throttle pedal and the function between the torque of the motor and number of revolutions, these are stored in an electronic memory unit, by the aid of a signal transmitter indicating the position of the throttle pedal an electric gas-signal is produced; furtheron, by the aid of a signal transmitter indicating number of revolutions (hereafter r.p.m.= revolutions per minute) from r.p.m. of the crankschaft of the motor or of any other component rotating proportionally therewith an electric r.p.m. signal is generated, gas-signal and r.p.m. signal are introduced into the electronic memory unit, wherein torque value belonging to the measured r.p.m. signal is located and a loading signal is formed by comparison; the load signal thus obtained is repeatedly compared with a signal - expressing a constant relative change-up value and a constant relative change-back value; by the aid of an r.p.m. evaluating unit r.p.m. signal is compared with a signal expressing a constant relative changing-up value and a constant changing-back value and if the load signal drops below the signal expressing relative load signal of changing-up and if the r.p.m. signal exceeds the signal expressing the relative r.p.m. of changing-up, by the aid of the unit controlling gear change a command signal is given for switching into the higher gear to the transmission, while if the load signal exceeds the signal expressing the relative value of changing-back or the r.p.m. signal drops below the signal expressing relative value of changing-back, by the aid of the control unit controlling gear change a command signal is released to the transmission for shifting into a lower gear.

The invention relates also to the process, in course of which the function between the torque of the motor and the position of the throttle pedal is determined as well as the function between the torque of the motor and r.p.m, these are stored in an electronic memory unit and by the aid of a transmitter yielding the signal relating to the position of the throttle pedal a gas-signal is generated, furtheron, by means of an r.p.m. signal transmitter an r.p.m. signal is formed from the r.p.m. of the crankshaft or any other component rotating proportionally therewith, electric gas-signal and r.p.m. signal are fed into the electronic memory unit, where we locate the torque value belonging to the measured r.p.m. signal and form a load-signal by comparison; within the part of the drive chain - beginning with the input shaft of the transmission and ending with the wheels - from the r.p.m of some of the structural parts of a pair of structural parts, taking the average number of revolutions as a basis, by means of an electric signal transmitter transmitting the signal being characteristic for r.p.m. an electric signal is generated and in a given case in compliance with the transmission of prevailing switched gear by means of a modifying unit for the correction of the gear an r.p.m signal being characteristic for the speed is generated; by the aid of a load evaluating unit load signal is repeatedly compared with a signal expressing a constant relative value of changing-up and a constant relative value of changing-back; by means of an r.p.m. evaluating unit velocity r.p.m signal is compared with a constant relative value of changing-back expressing signal and if the load signal drops below the signal expressing the relative load value of changing-up and velocity r.p.m signal exceeds the value expressing the relative r.p.m value of changing-up, by the aid of a unit controlling gear-change a command signal is given to the transmission organs for shifting to a higher gear, while, if the load signal exceeds the signal expressing the relative value of changing-back, or velocity r.p.m drops below the signal expressing the relative value of changing-back by the aid of the unit controlling gear change a command signal is forwarded to the gear changing organs for shifting into a lower gear.

With a preferred embodiment of the process according to the invention the load signal is compared by means of a load signal evaluating unit with a signal expressing the relative short-circuiting load signal belonging to the short-circuiting of the hydraulic torque converter, the r.p.m signal of velocity or the r.p.m signal expressing the r.p.m of the crankshaft of the motor is compared by means of the r.p.m. evaluating unit with the signal expressing the relative short-circuiting r.p.m belonging to the hydrodinamic torque converter, when short-circuited, as well as with a signal expressing the relative releasing r.p.m. value belonging to the releasing r.p.m of the hydrodynamic torque converter; if r.p.m signal exceeds the signal expressing the relative value of short-circuiting r.p.m and the load signal drops below the signal expressing the relative load value of short-circuiting, by the aid of a unit controlling closing of the clutch a command signal is forwarded to short circuiting gear changing organ short circuiting the hydrodynamic torque converter, and if the r.p.m signal drops below the signal expressing the relative value of releasing r.p.m, a command signal for release is transmitted.

With another preferred embodiment of any of the processes according to the invention the r.p.m signal expressing the number of revolutions of the crankshaft of the motor or r.p.m signal of velocity is fed into the memory unit and with the command signal of the gear change control unit producing changing-back momentary r.p.m is stored, thereafter, by the aid of the unit generating the relative load signal with the correction value— depending on the stored r.p.m signal— the signal expressing constant relative load value and/or in a given case constant relative short-circuiting load, i.e. the signal expressing it is reduced.

With the third preferred embodiment of the invention, r.p.m signal expressing the revolutions per minute of the crankshaft of the motor or r.p.m signal of velocity is fed into a memory, with the command signal of the gear-change control unit generating changing-back momentary r.p.m signal is stored, thereafter by means of the unit generating the relative r.p.m signal, with a correction value— depending on the stored r.p.m signal— the signal expressing constant relative r.p.m value of changing-up and/or in a given case the signal expressing constant relative r.p.m of short-circuiting is reduced.

With the fourth preferred embodiment of the process according to the invention with the command signal of the gear-change control unit producing changing-back the signal expressing constant relative r.p.m value of changing-up and/or in a given case the signal expressing constant relative r.p.m of short-circuiting are (is) increased by a pre-determined value or the signal expressing constant relative load value of changing-up and/or in a given case constant relative load value of short-circuiting is/are reduced with a pre-determined value.

With the fifth embodiment of the process according to the invention from the r.p.m expressing r.p.m of the crankshaft of the motor or from the r.p.m signal of velocity, in the unit evaluating the change in revolutions per minute a signal indicating the change in r.p.m is generated and in a given case from the load signal in the unit evaluating change in load a signal indicating the change in load is generated and with the command signal of the gear-change control unit for producing changing-back to a lower gear, from the momentary values we generate at the negative r.p.m changing signal and at the r.p.m signal expressing the r.p.m of the crankshaft of the motor lying below the limit value or at a negative signal indicating to the change in load a signal expressing the constant normal relative load value is generated; at a positive signal indicating the change in number of revolutions and at an r.p.m signal expressing the r.p.m of the crankshaft of the motor or at a positive signal indicating the change in load— a signal expressing the relative constant value of load when overtaking— being less than the previous one— is generated, furtheron, with a negative signal of the change in number of revolutions and at an r.p.m signal expressing r.p.m of the crankshaft of the motor lying above the limit value or at a positive signal indicating the change in load, we form a signal expressing a quite low relative load value, being constant, for the ascent, all the signals thus formed are fed in the load evaluating unit.

With a further preferred embodiment of the process according to the invention with the command signal of the gear change control unit for changing-back to a lower gear, when the signal indicating the change in r.p.m is negative, or at an r.p.m signal expressing the r.p.m of the crankshaft of the motor and exceeding the limit value, or at a signal with the positive sign indicating change in load, a signal is generated expressing a quite low constant relative load value for the ascent, in all other cases a signal is generated expressing a constant normal relative load value.

At last, any version of the process according to the invention can be realized so, in so far as the signal expressing the relative load value of changing-up and the signal expressing the relative load value of short-circuiting are equal and when the load signal drops below the signal expressing the relative load value of changing-up and when the r.p.m signal chosen for the r.p.m evaluating unit exceeds the signal expressing r.p.m value of changing-up, simultaneously with the command signal of the unit controlling gear change for shifting into a higher gear an inhibiting signal is given to the unit controlling closing of the clutch.

Figure 2:
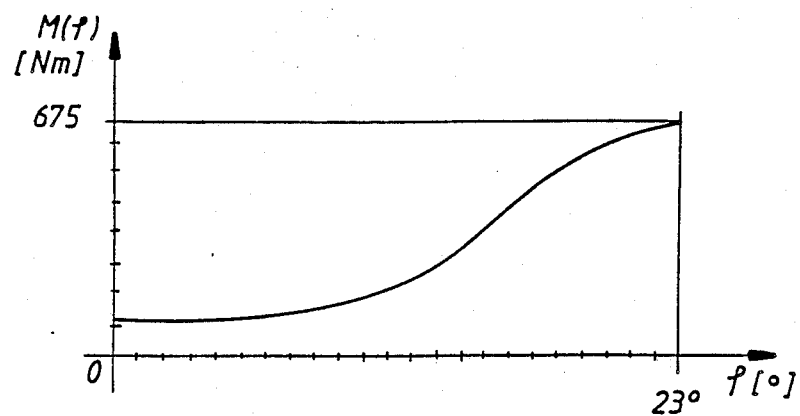

The invention will be detailed by explaining some preferred embodiments of the process according to the invention with reference to the drawings enclosed. In the drawings:

FIG. 1 is the schematic view of the drive chain of an autobus,

FIG. 2 the diagram of the r.p.m /torque of the motor

Figure 3:
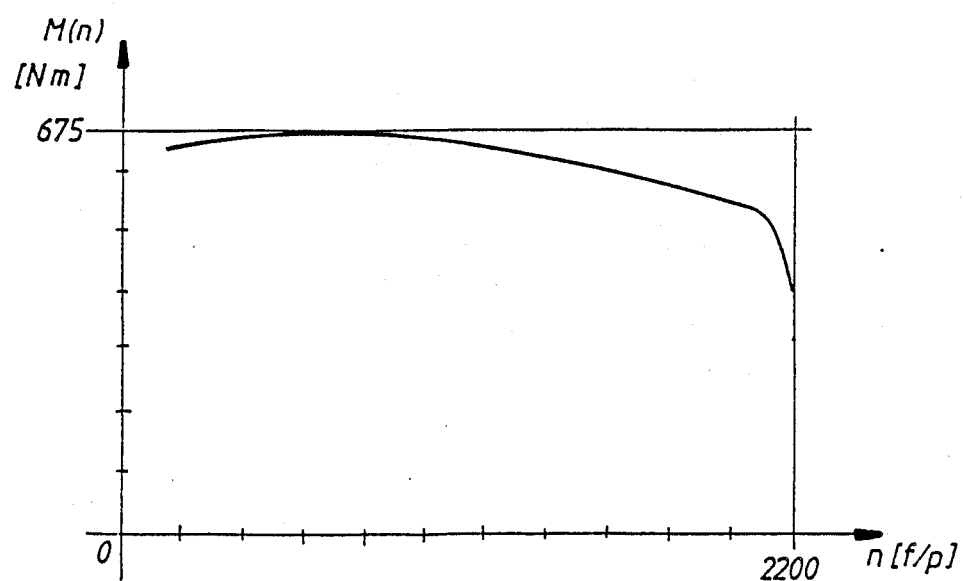

FIG. 3 the diagram of the position of the throttle pedal/torque of the motor

Figure 4:
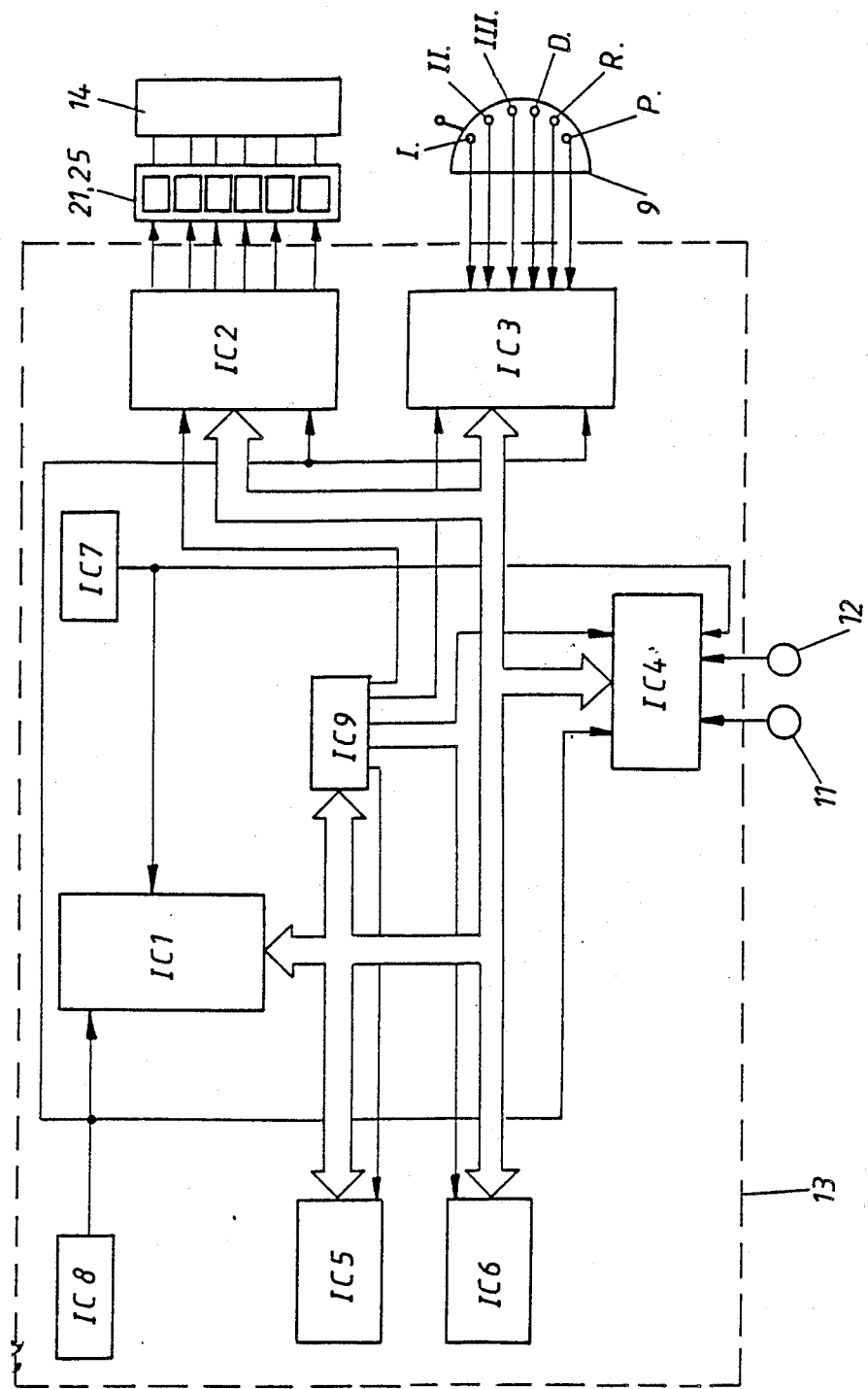
Figure 5:
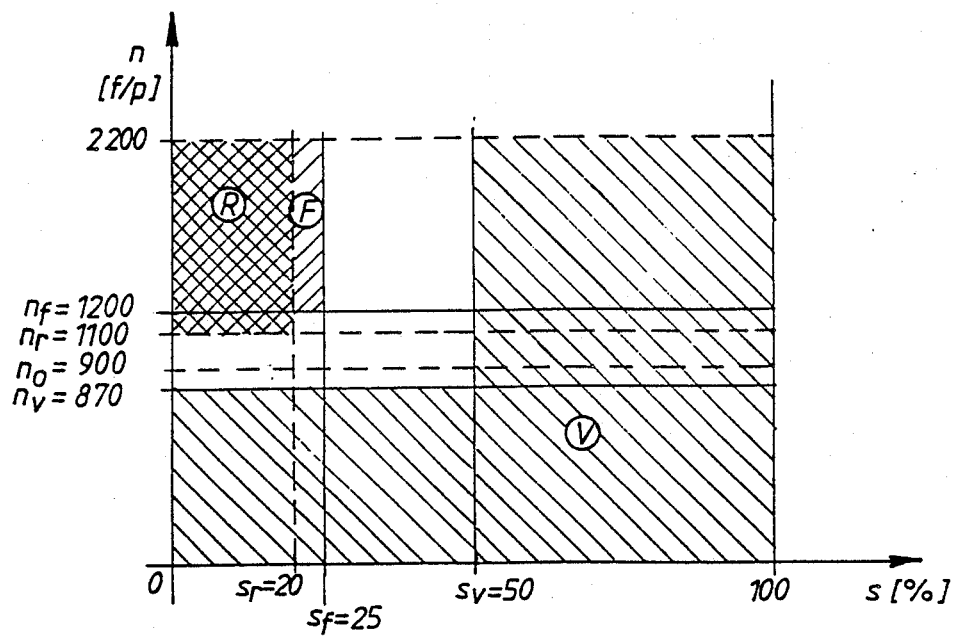
Figure 6:
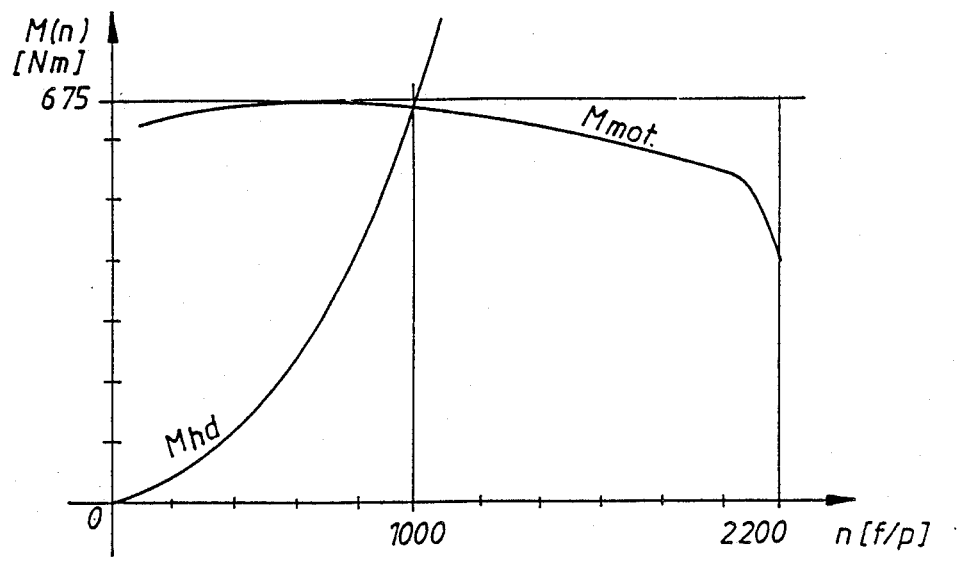

FIG. 4 the circuit arrangement of a possible version of the electronic control unit for the implement of the process according to the invention FIG. 5 conditions depending on r.p.m and load FIG. 6 relative position of the diagram r.p.m /torque of the motor and the hydrodynamic torque converter, respectively FIG 7–15 are block-schematics illustrating the implementation of the versions of the processes.

The process according to the invention, as detailed in the aforementioned, can be realized in several versions, and can be equally used for an automatic transmission and automatically actuated mechanic synchronized transmission as well. For the actual realization of the invention an electronic unit was developed which is well suitable for any version of the process and to any transmission in dependence of the program stored. Now we shall describe the basic version, in cases being different we shall refer only to deviations. For the sake of order it should be mentioned that for the sake of more accurate understanding first of all simpler steps of the process will be described, thereafter more complicated phases will be specified using always separate block-schematics. For this reason block-schematics were drawn so as superpositions could be appreciated visually too.

The actually realized version of the process was prepared for an autobus for city traffic, the motor 1 — as to be seen in FIG. 1 — represents the power source. In respect to design, the motor is a six-cylinder Diesel motor with an output of 140 kW, torque diagram in dependence of throttle pedal position ($M=f/\phi$) is shown in FIG. 2, while diagram of torque versus revolutions per minute ($M=f/n$) is shown in FIG. 3.

Number of revolutions (r.p.m) in the basic run na=5-00–500 r.p.m. the lowest operative r.p.m=nümin=880 r.p.m, the highest operative r.p.m=nümax=1800 r.p.m and the highest r.p.m n max=2000 r.p.m.

Motor 1 drives the transmission 2. Transmission is an automatic transmission with an epicyclic gear, operating in four stages (four forward gears and one reverse gear). Gear ratio of the gears:3,43, 2,01, 1,42 and 1,00. Drive-shaft of the single gears is connected to the crankshaft of the motor 1 through the hydrodynamic torque converter 4 and the friction clutch 3 short-circuiting it. Gear-change and releasing-opening of the friction clutch 3 are controlled with the electromagnetic valves 14.

Value of the theoretical average velocity: when shifting to II 18 km/h, to III 25 km/h, to IV 40 km/h, when changing back to III 35 km/h, to II 22 km/h, to I 3 km/h, final speed of the autobus: 80 km/h.

Output shaft of the transmission 2 is connected to the differential gear 6 of the axle-housing through the cardanshaft 5, while differential gear 6 is connected to the wheels 8 via the half-axles 7. These units form the drive chain of the autobus.

It should be mentioned that the process according to the invention is suitable also for passenger cars. As it is well known, with passenger cars with frontal drive and rear engine generally transmission and differential gear are built together, in this case the drive chain does not comprise the cardanshaft.

The electronic control unit 13 controls the electromagnetic valves 14. Informations needed for control are generated with signal transmitters.

One of the most important informations lies in, in which way the driver intends to perform gear change. The key 9 for selecting the gears, also known as controller, may formed as a lever or with a push-button. With whatever formation the following positions of gear-changes can be established by giving the proper command: transmission 2 is in the neutral position N, in position I it does not shift higher, in position II it does not shift higher, it does not shift higher than III gear, in the position D — direct or fourth gear— and in reverse gear "R" and shifting into the parking braked positions are also carried out. Outputs I, II, III, D, R, P of the gear-selecting switch 9 are connected to the corresponding inputs of the electronic control unit 13.

As a matter of fact, with the process according to the invention there is no need that the driver should inhibit shifting into one or more stages by using the gear-selecting switch 9. Proper selection of conditions of changing-up excludes namely that uncertain positions may occur in course of changing-back, which could be eliminated otherwise by an external intervention (by positions of the gear-selecting switch I, II and III). In such a manner said positions can be even omitted. There is one single reason, however, for keeping inhibiting positions, namely in case of certain failures of control of the automatic transmission the motor vehicle can be kept still in the operative state for a certain period— e.g. till arriving at the garage or workshop — by using said means and manual control.

Further informations may be gained by means of the transmitter 11 indicating the position of the throttle pedal 10, the pedal is built together with said transmitter and controls fuel supply of the motor 1. Complete angular displacement of the throttle pedal 10 amounts to 23°, the transmitter 11 indicating the position of the throttle pedal delivers continuously the electric signal being proportional with the displacement in the whole range of angular displacement, i.e. between 0° and 23°. The transmitter 11 indicating the position of the throttle pedal is also connected to one of the inputs of the electronic control unit 13.

At last, a most important information is the number of revolutions of the motor 1. The r.p.m signal nm expressing the number of revolutions of the crankshaft of the motor 1 which is well suitable for control, is generated so that a signal transmitter 12 for the number of revolutions was built to the camshaft of the motor 1 and it was connected to the input of the electronic control unit 13. Transmission of the camshaft to the crankshaft with the ratio 1 : 2 was considered in the electronic control unit 13 immediately after the input.

In knowledge of the single steps of process the electronic control unit 13 may be assembled in several versions. One of the possible versions is illustrated in FIG. 4. Electronic elements are referred to in accordance with the IC-catalogue published by the Technical Publisher (Hungary). The control unit 13— as illustrated in FIG. 4— consists of the IC 1 microprocessor (catalogue number z 80A), the IC 2 and IC 3 programmable input-output unit (catalogue number 8255), the IC 4 three-channel programmable counter and timing unit (catalogue number 8253), the IC 5 RAM unit (catalogue number: 4016), the IC 6 ROM unit (catalogue number 2732), the time-pulse generator (catalogue number 7434), of the IC 8 reset-unit (catalogue number LS 132) and the IC 9 decoder unit (catalogue number 74 LS 138).

Address-, date- and controlling connections with identical function of the microprocessor IC 1, so the IC 2 and IC 3 programmable input-output units, the IC 4 three-channel programmable counter- and timing unit, IC 5 RAM, IC 6 ROM unit, the decoder IC 9 are interconnected.

The IC 8 reset-unit is connected to the "reset points" of the IC 1 microprocessor, the IC 2 and IC 3 programmable input-output units, and the three-channel programmable counter- and timing unit IC 4.

Out-puts of the decoder IC 9 are individually connected with the chip-select inputs of the IC 2 and IC 3 programmable input-output units, the IC 4 three-channel programmable counter- and timing unit, the IC 5 RAM unit and the IC 6 ROM unit.

IC 7 time-pulse generator is connected to the time-signal input of the IC 1 microprocessor and the IC 4 three-channel programmable counter- and timing unit.

The electronic control unit 13 is interconnected with the elements partaking in control in the following way:

The signals arriving from the decoder 9 (from the output thereof) are received by the inputs of the IC 3 programmable input-output unit, while the signals of the transmitter 11 indicating the position of the throttle pedal and the r.p.m signal of the transmitter 12 are received by the inputs of the three-channel programmable counter-and timing unit IC 4.

Control signal of the electronic control unit 13 appears on the outputs of the IC 2 programmable input-output unit. Said outputs are connected to the electric inputs of the electromagnetic valves 14 via the power amplifiers 21 and 25. Power amplifiers do not form the parts of the electronic control unit 13, their installation is not at all problematic for those skilled in arts.

For the sake of order it should be mentioned that the circuit arrangement as illustrated in FIG. 4 does not show accurately the functional units to which we shall refer in the following, while describing the different versions and belonging block-schemes. The explanation lies in that by using electronic elements specialized according to operations, the electronic control unit can be built up more easily. So.e.g. it is quite obvious that a memory with a large capacity is able to store all the informations by itself to which in the block-schematic separate memory units were ordered for the sake of better understanding.

Figure 7:
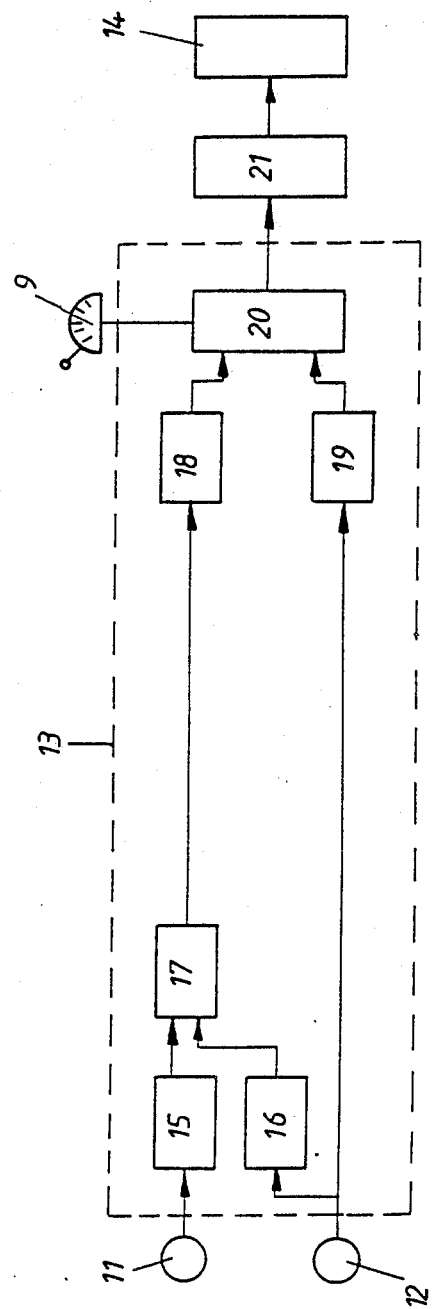

The process according to the invention is realized in the following way, according to the block-schematic in FIG. 7. The diagram m/φ/ expressing the function of the position of the throttle pedal and the torque, respectively, is written into the memory 15 (see FIG. 2), while the diagram M/n/— illustrated in FIG. 3— expressing the function of number of revolutions and torque is also written into the memory 16.

In a general case gear-change is taking place as follows:

When the driver intends to start the vehicle, he switches the gear-selector 9— being up to now in the neutral position N— to the position D. If all the conditions of safe start of the autobus are fulfilled, by pressing the throttle pedal 10 the driver increases number of revolutions of the motor 1, the gear-change control unit 20 gives the command signal through the power amplifier 21 to the electromagnetic valves 14 to shift to the basic gear. As a consequence, the autobus starts with the basic gear.

Henceforth the transmitter 11 indicating the position of the throttle pedal delivers the gas-signal continuously to the memory 15, while the transmitter 12 forwards the r.p.m signal to the memory 16. Memory 15 selects continuously theoretical torque value belonging to prevailing position of the throttle pedal from the stored diagram (M/$\phi$). In a similar way, the memory 16 selects continuously the torque value belonging to prevailing number of revolutions from the stored diagram M/n. By comparing the two torque values one may conclude on the load of the motor 1.

All these are happening in the unit 17 forming the load signal, into which signals of both memory 15 and memory 16 are fed.

Using the formula $$s = \frac{\int M/\phi/d\phi - \int M/n/dn}{\int M/\phi/d\phi} \cdot 100\%$$

we receive the load signal s expressed in %. With changing position of the throttle pedal and changing of r.p.m load signal s is changing continuously according to sense.

Load signal s is led from the unit 17 generating the load signal to the unit 18 evaluating the load. In the same manner the signal of the transmitter 12— indicating r.p.m — is led into the unit 19 for evaluating r.p.m Evaluation of the load signal s and r.p.m signal nm can be best understood on basis on FIG. 5.

Load value and value of revolutions per minute are determined experimentally, in case of simultaneous fulfillment the motor could move the autobus in the next higher gear without reducing velocity of the autobus. Similarly, we determine load value and value of r.p.m, at which, if one of them has been reached, the vehicle should be downshifted to a lower gear; otherwise, the bus will slow down.

From FIG. 5 it becomes obvious that transmission 2 is to be shifted to the following higher gear if
— prevailing load value drops below a constant relative sf load value of changing-up, wherein sf=25%, and
— prevailing number of revolutions of the motor exceeds the constant relative r.p.m value nf of changing-up, wherein nf=1200 revolutions per minute.

Conditions of changing-back are in that either
prevailing load value should exceed a constant relative load value sv of changing-back, wherein said value, sv=50 %, or
prevailing r.p.m of the motor should drop below a constant relative value nv of changing-back, wherein nv=870 revolutions per minute.
These conditions define a range of changing-back "V" in FIG. 5.

Accordingly, the task of the load evaluating unit 18 is to determine the level of the actual load signal s, within the range extending theoretically from 0 to 100 % , and if the signal s drops below the signal sf expressing relative load value of changing-back, a signal expressing the necessity of generating the signal for changing-up is led into the gear-change control unit 20, while, if the signal s exceeds the signal sv expressing the relative load value for changing-back, a signal is generated indicating the necessity of changing-back, which is led to the gear-change control unit 20.

Evaluation of the r.p.m signal nm is taking place in a similar way in the unit 19 evaluating the number of revolutions, the task of which is to examine the level of the prevailing number of revolutions within the range extending from 0 to 2200 r.p.m. If actual number of revolutions exceeds the relative r.p.m value nf of changing-up, a signal indicating the necessity of upshift is forwarded to the gear-exchange control unit 20, while if it lies below the relative value of changing-back nv, a signal is generated expressing the necessity of changing-back and led to the gear-change control unit 20.

Returning now to the autobus, as soon as load value s and actual number of revolutions arrive at the range "F" of changing-up in FIG. 5, the gear-change control unit 20 is giving a command signal through the power amplifier to the electromagnetic valves 14 to disconnect the gear I and to connect gear II.

In course of gear-change friction clutch is generally closed, the reason will be explained later. In such a manner problem of asynchronism appears here too. As solution of the problem does not form the object of out invention, we do not go into details. Shortly, the only thing which should be known is that hydraulics— due to the nature— causes delay in function, this delay was promoted by incorporating an element into electronics, providing for a delay of 50 m sec. In such a way essentially an overlapping switching was obtained. The gear change control unit 20 gives a command signal in this case too for shifting into the III and IV gears, if the load value s and actual number of revolutions again get into the range "F" of FIG. 5, in compliance with the intention of the driver directed to the increase of velocity.

It is easy to see without explanation that gear change control unit 20 is helped by an internal memory when choosing the proper gear, which stores the identifying signal of prevailing gear. In such a manner the gear change control unit 20 is able to decide which gear should be shifted to in addition to the evaluation of the necessity of changing-up or changing-back. For the sake of order it should be mentioned that the gear change unit 20 has to fulfil a further function, namely, if in course of travel the transmission 2 is shifted eventually to the neutral position, thereafter, while travelling we intend to shift again to any of the gears, it is the task of the gear change unit 20 to decide which gear corresponds primarily to the actual velocity of the vehicle. As these partial solutions do not form the subject of our invention, we do not deal with the matter.

At last, it belongs also to the object, in so far as, — although knowledge of the actual velocity of the vehicle is not unconditionally needed for the control according to the invention— the last mentioned task of the gear-change control unit 20 cannot be fulfilled, for this reason the transmission 2 is provided with transmitter 34 transmitting number of revolutions, this will be described later.

In compliance with gear change one has to provide for the closing and releasing the friction clutch. To determine the conditions having been applied here, some explanation is indispensable.

As it is well known, torque transferring ability of the hydrodynamic torque converter 4 differs from the torque arising on the crankshaft of the motor 1. At about a revolution per minute of 1000 the two torques are equal, at an r.p.m being less than 1000 torque transfer ability of the hydrodynamic torque converter 4 is less, with a higher r.p.m it is higher than the torque to be measured on the crankshaft of the motor 1. Torque diagram of the hydrodynamic torque converter applied in this case— i.e. M/n/— has not been drawn up, accordingly, in FIG. 6 we intend only to illustrate the relationship of the torque diagram (M/n/) of the motor 1 and the hydrodynamic torque converter 4. Mmot represents the diagram of the motor 1, Mhd the diagram of the hydrodynamic torque converter 4. That means, that if during 1000 revolutions/min the friction clutch 3 is not short-circuited, the hydrodynamic torque converter will slip, and the number of revolutions of the motor 1 will not be less, as a consequence, the motor 1 will be able to drive the autobus at the same gear. It is quite obvious that at a higher number of revolutions the smallest slip arising on the hydrodynamic torque converter 4 represents a superfluous loss, accordingly it seems to be expedient to short-circuit the friction clutch 3.

Accordingly, conditions of function of the friction clutch 3 are determined— with reference to FIG. 5— in the following way:

Friction clutch 3 short-circuits
  if current number of revolutions exceeds a constant relative r.p.m value nr of short-circuiting, wherein nr=1100 revolutions per minute, and
  current load value drops below the relative load value sr of short-circuiting, wherein sr=20 %
and releases
  if the current r.p.m drops below a constant relative number of revolutions no of release, wherein no=900 r.p.m.

Summing up what has been said, value of number of revolutions was not determined in the point of intersection of the torque curves, i.e. 1000 r.p.m, because in this way function of the friction clutch 3 was more defined.

Figure 8:
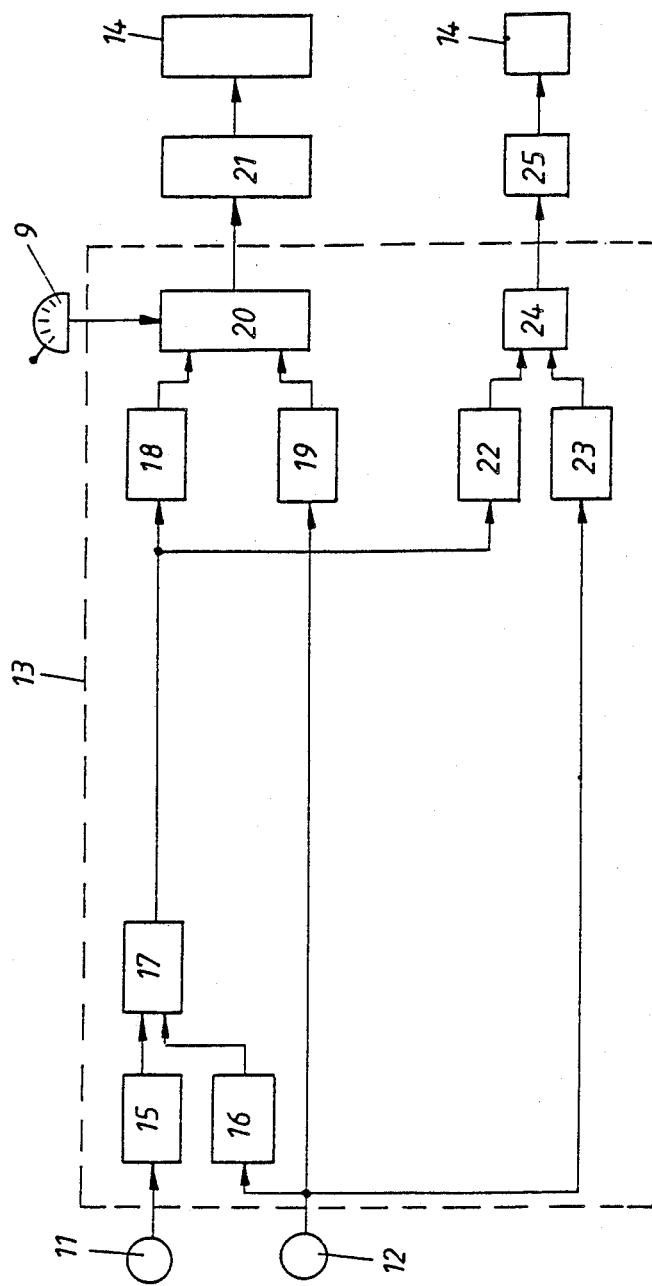

For carrying out the steps as detailed above, i.e. for the control of closing-releasing the friction clutch 3 according to the scheme of FIG. 8, the load signal of the unit 17, is fed into the load evaluating unit 22, while the r.p.m signal of the transmitter 12 is led into the r.p.m evaluating unit 23, wherein said signals are compared with the relative load value sr of short-circuiting, the relative number of revolutions nr of short-circuiting and with the relative r.p.m value no of releasing. Now, if load value s drops below the relative load value sr of short-circuiting and number of revolutions exceeds the r.p.m value nr of short-circuiting, the unit 22 evaluating load and the unit 23 evaluating number of revolutions emit a signal expressing the necessity of short-circuiting the friction clutch 3 to the unit 24 controlling short-circuiting, which gives the command signal for short-circuiting through the power amplifier 25 to one of the electromagnetic valves 14, namely to one which is actuating the friction clutch 3. Now, the friction clutch 3 becomes short-circuited, that means a mechanic connection is established between the crankshaft of the motor 1 and the in-drive shaft of the gear-part of the transmission 2.

From FIG. 5 it becomes obvious that the relative load value sr of short-circuiting is more stringent than the relative load value sf of changing-up, at the same time r.p.m value nr of short-circuiting is more "lenient" than the relative r.p.m value nf of changing-up. By this arrangement it was achieved that while the load of the motor was more intense, i.e. hydrodynamic torque converter 4 was indispensable, as the driver intended to increase the velocity of the motor vehicle, first of all changing-up into a higher gear happens, while if load is more advantageous, short-circuiting of the friction clutch 3 takes place.

As it is well known, there are three causes for changing-back the transmission 2, namely the driver decelerates, or he accelerates considerably (in course of overtaking) or the autobus travels in ascent.

The most simple case is when the driver decelerates the car. In this case he lets the throttle pedal 10 back in its basic position; as a consequence, number of revolutions of the motor 1 is reduced. As soon as number of revolutions drops below the relative value r.p.m no of releasing, the unit 23 evaluating number of revolutions gives a signal—expressing the necessity of releasing the friction clutch 3—to the control unit 24 controlling the closing of the clutch, which forwards a command signal for releasing through the power amplifier 25 to one of the electromagnetic valves 14, namely to that special valve which actuates the friction clutch 3. Now the friction clutch 3 is released and thereafter torque is transferred through the hydrodynamic torque converter 4.

As soon as r.p.m of the motor 1 is further reduced and it drops below the relative r.p.m value nv of changing-back, the unit 19 evaluating r.p.m generates a signal expressing the necessity of changing-back, as a consequence, the unit 20 controlling gear change gives a command signal through the power amplifier 21 to the electromagnetic valves 14 for disconnecting the gear IV and to switch to gear III.

Now, if the driver intends to continue decelerating, simultaneously with reduction of r.p.m of the motor 1 the unit 20 controlling gear change will give a command signal to change-back into a lower gear.

The situation changes in case of a considerable acceleration, as well as during ascent. In this case a rather incertain situation of changing may occur, which used to be eliminated up to now simply by defined adjustment of conditions of changing-up in one or two steps. In course of the process according to the invention—by examining the state of loading prior to changing-back to a lower gear—conditions of changing-up are adjusted only to the necessary extent and without interstages.

In order to be able to realize the process, method and extent of adjustment are to be realized. For this purpose we ascertained experimentally that relative load value sf of changing-up has to be adjusted to 6% at most, that means that relative load value sfk of changing-up must lie in the range between 25% and 6%, respectively.

Extent of adjustment is to be selected in dependence of the extent of load prior to changing-back. As one of the basic data of load is given by the r.p.m signal, it suffices to examine the number of revolutions of the motor 1 in the moment of changing-back, i.e. the place having been occupied within the range of the operative number of revolutions. With the motor having been applied in this case operative r.p.m amounts to 880-1800 r.p.m. In the first approach we supposed a linear correlation between the location of number of revolutions prior to changing-back within the range of operative r.p.m and aggravation of the condition of changing-up. Based on our experiences, modification of said supposition did not become necessary. However, it seemed to be expedient to determine proper correlation experimentally.

In case of a linear correlation correction is taking place by the aid of the following formulae:

$$k = \frac{n_{back} - n_{oper.min}}{n_{op.max} - n_{oper.min}}$$

wherein
k = factor of correction
$n_{back}$ = r.p.m prior to changing-back
$n_{op.min}$ = the lowest operative number of revolutions (880 r.p.m)
$n_{op.max}$ = the highest operative number of revolutions (1800 r.p.m)
in this way:

$$sk = k/sf - sfmin/$$

wherein
sk = stands for the correction value
k = the previous factor of correction
sf = normal relative load value of changing-up (25%)
sfmin = the most severe relative load value of changing-up (6%) and at last $$sfk = sf - sk$$

$$srk = sr - sk$$

wherein
sfk = corrected relative load value of changing-up
srk = corrected relative load value of short-circuiting.

Figure 9:
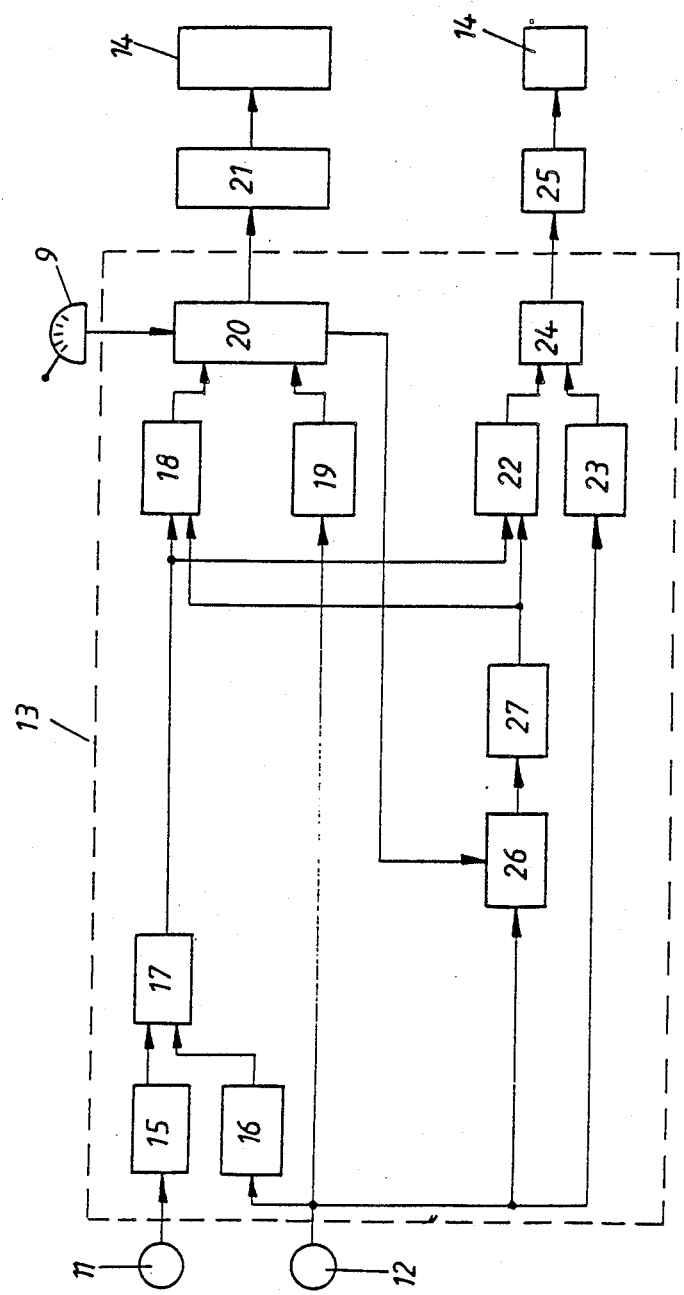

In knowledge of all what has been said and by the aid of FIG. 9 the process can easily be understood. The r.p.m. signal of the transmitter 12 is contiuously fed into the memory 26.

Now, if the driver begins to overtake, he presses down the throttle pedal 10 with force. The higher value from the function M/φ/ will belong now to the changed position of the throttle pedal, as a consequence, the load signal having been generated in the unit 17 forming the load signal increases and after having reached the value sv, the unit 20 controlling gear change gives—in a way already described—command signal to the electromagnetic valves 14 for shifting into a lower gear.

Simultaneously, the unit 20 controlling gear change gives a command signal to the memory 26 for storing the r.p.m signal just arrived. From this r.p.m signal, in the unit 27 forming the relative load signal—in compliance with the previously presented formulae—correction value sk is generated and led into the load evaluating unit 18 and to the unit 22. Thenceforth the load evaluating unit 18 compares the load signal coming from the unit 17 with the signal expressing the corrected relative load value skf of changing-up having been modified by the correction value sk and only in case of fulfillment of said adjusted condition a signal will be forwarded to the unit 20 controlling gear change indicating the necessity of shifting into a higher gear.

In a similar way, the unit 22 evaluating load—if the load signal lies below the signal expressing the corrected relative load value srk of short-circuiting having been modified with the correction value sk—forwards a signal to the unit 24 controlling short-circuiting of the clutch indicating the necessity of short-circuiting the friction clutch 3.

After having finished overtaking or acceleration, number of revolutions of the motor 1 "pulls up" to the position of the throttle pedal, the load signal s will be less, and as soon as it drops below the corrected relative load value sfk of changing-up, the load evaluating unit 18 gives a signal to the gear change control unit 20 indicating the necessity of changing into a higher gear.

The gear change control unit 20 extinguishes the correction value sk with its command signal, as a consequence, gears and basic conditions of short-circuiting the friction clutch 3 are restored.

Essentially the same process is taking place when the autobus is travelling on a hill, upwards. Now, in this case load signal s does not change by pressing down the throttle pedal by the driver but by the reduction of the number of revolutions of the motor 1, from the diagram M/n/ memory 16 chooses the lower torque, in such a manner with unchanged position of the throttle pedal load signal s will be higher and as soon as it reaches the relative load value sv of changing-back, the load evaluating unit 18 signals the necessity of changing-back to the gear change control unit 20 which releases the command signal, for changing-back into the lower gear. Simultaneously therewith the previously described process is started.

It goes without saying that condition of gear change can be altered not only by changing the relative load value sf of changing-up, but also by changing the relative r.p.m value nf of changing-up. This may happen in the following way:

k factor of correction is the same as previously, so $$nk = k./nfmax - nf/$$

wherein
nk = correction value
nfmax = the most adjusted relative r.p.m value of changing-up (1700 r.p.m)
nf = normal relative r.p.m value of changing-up (1000 r.p.m)
at last
nk = corrected relative r.p.m value of changing-up
nrk = corrected relative r.p.m value of short-circuiting.

Figure 10:
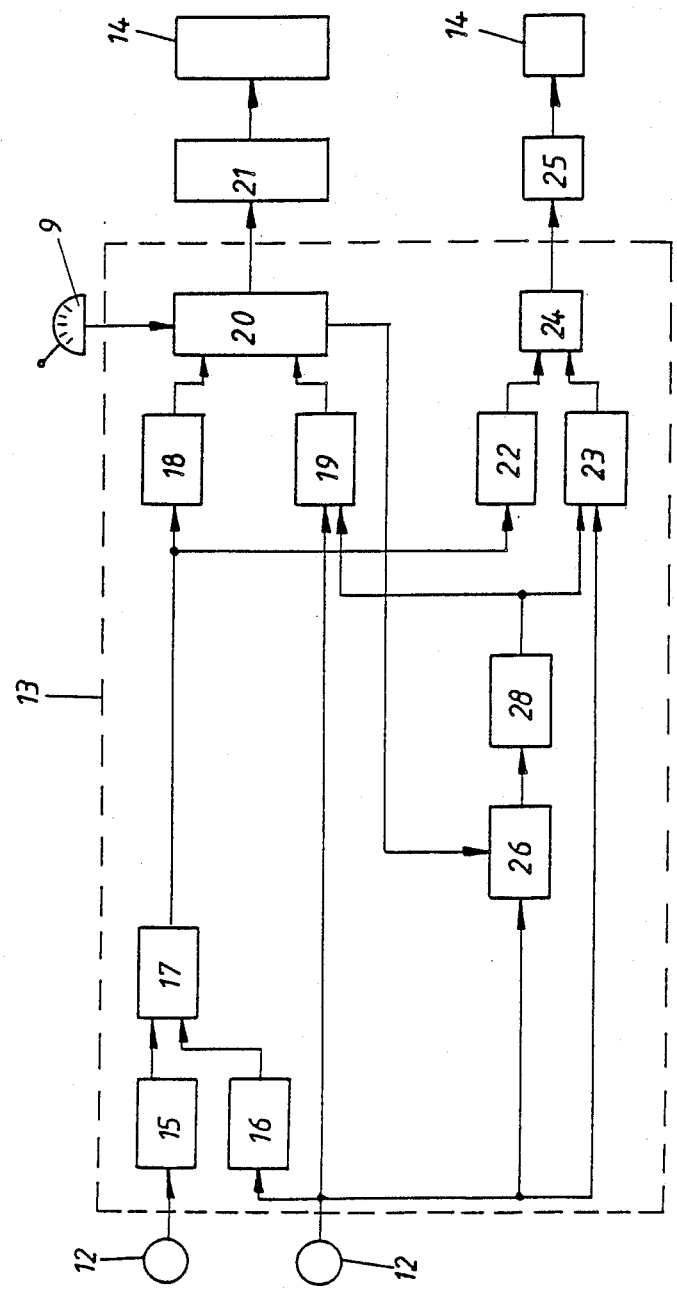

The version of the process can be understood easily with the help of the block-schematic in FIG. 10. It can be well seen that by using the command signal of the gear change control unit 20 and by using the r.p.m signal stored in the memory, the unit 28 generating the comparative r.p.m signal determines the correction value nk and forwards it to the r.p.m evaluating unit 19 and the unit 23, also evaluating number of revolutions. Henceforth the process is taking place quite analogously with the previously described proceedings, accordingly, detailed specification is considered to be superfluous.

When adjusting the conditions of changing-up we started from the supposition, in so far elimination of incertain changing situation will be the more probable, the stricter adjustment are applied. However, it may happen that adjustment is overdimensioned and cannot be fulfilled. This situation can be facilitated by the driver himself by creating a pushing operation with a short taking-off of the gas, in course of which load signal s drops surely below 6%. The system may be provided with an auxiliary program too, in sense of which, if the number of revolutions of the motor 1 surpasses 2050 r.p.m, aggravation of conditions of changing-up is extinguished automatically. Diverse simplified version of the process according to the invention can also be realized.

Figure 11:
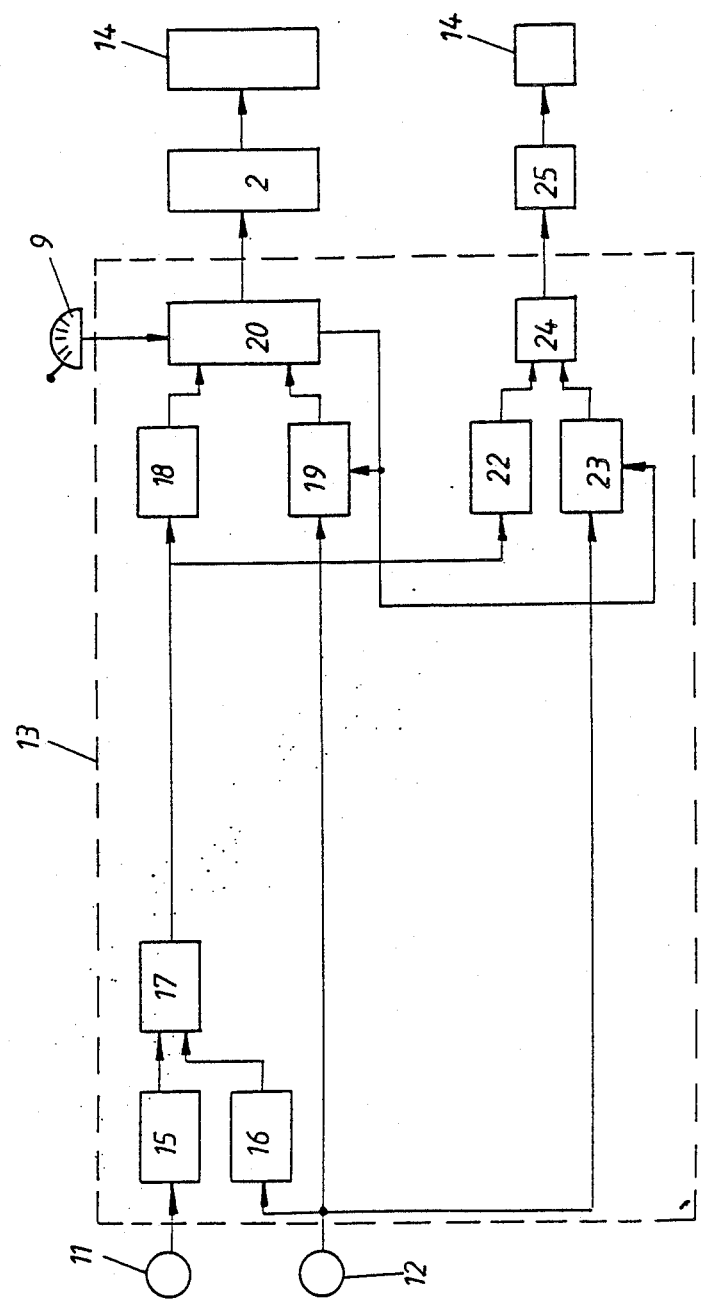

The most simple version can be understood by the aid of the scheme according to FIG. 11. In this case gears are shifted under normal conditions in the same way, as with the aforementioned version. That means that the memory 15 locates (searches for) the torque value belonging to the gas-signal of the signal transmitter 11 indicating the position of the throttle pedal from the diagram (M/φ/) and the memory 16 selects the torque value belonging to the r.p.m signal of the transmitter 12 from the diagram M/n/.

The unit 17 forming the load signal generates the load signal s from the torque values, this signal is examined in the load value evaluating unit 18, while the r.p.m signal is examined in the evaluating unit 19 in respect to conditions of gear change and informs the gear change control unit 20 about the necessity of changing-back or changing-up, which again releases the command signal through the power amplifiers 21 to the electromagnetic valves 14.

In comparison to previously specified versions of the process, simplification lies in the way of adjustment of the conditions of changing-up. In the unit 19 for evaluating number of revolutions in addition to the normal comparative r.p.m value nf of changing-up an aggravated comparative r.p.m value nfs of changing-up is also contained in form of a programme. Similarly, the r.p.m evaluating unit 23 also contains the programmed normal comparative r.p.m value nr of short-circuiting and the aggravated comparative r.p.m value nrs of short-circuiting.

If the gear change control unit 20 gives a command signal to the electromagnetic valves 14 through the power amplifiers 21 for changing-back to a lower gear, simultaneously with the command signal for changing-back a command is forwarded to the r.p.m evaluating unit 19, in so far as furtheron r.p.m signal of the transmitter 12 should be compared with the adjusted comparative r.p.m value nfs. In the same manner, r.p.m evaluating unit 23 receives a command signal from the gear change control unit 20, in so far as furtheron the condition of short-circuiting the friction clutch 3 is the adjusted comparative r.p.m nrs of short-circuiting.

The adjusted command signal of the gear change control unit 20 will be extinguished by the command signal relating to the following changing-up.

Adjusted comparative r.p.m value nfs of changing-up and adjusted r.p.m value nrs of short-circuiting may correspond in case of the previously described version of the process to the defined most adjusted comparative r.p.m values nfmax of changing-up, resp. to the most adjusted comparative r.p.m values nfmax of short-circuiting.

Figure 12:
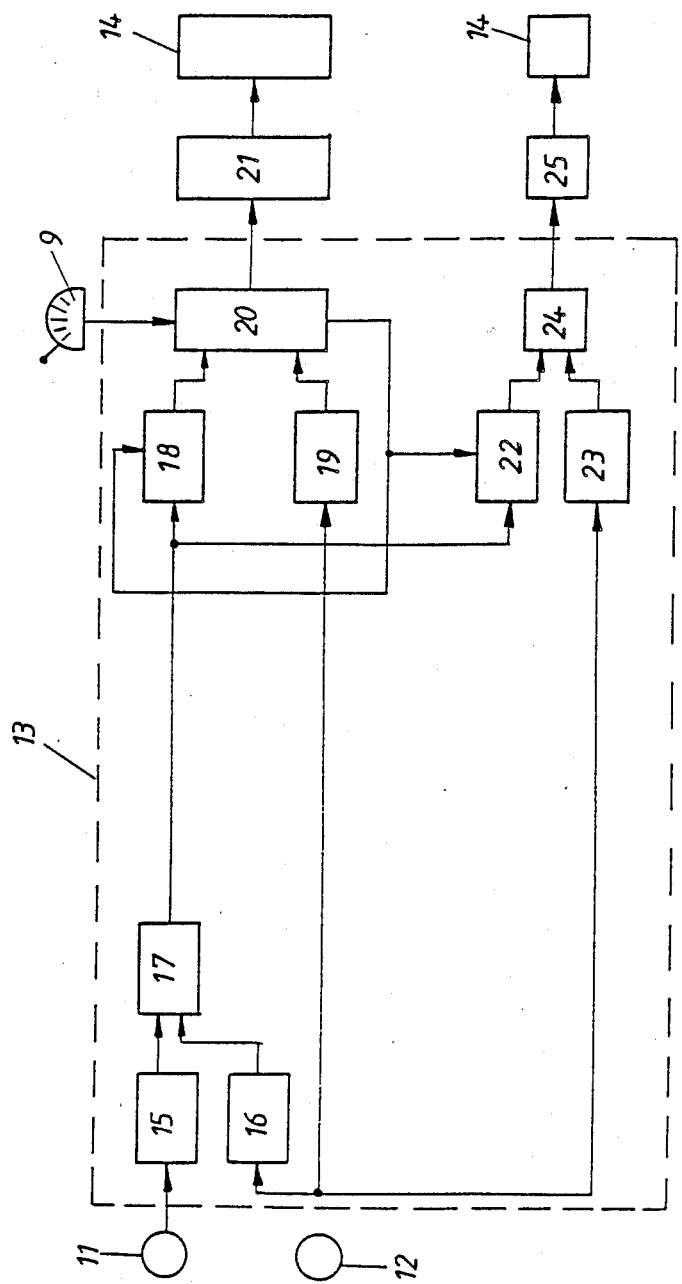

From the block schematic in FIG. 12 it can be seen well that a most simple version of the process can be realized—similarly to the previous one—even if out of the conditions of gear change not the number of revolutions is examined but the load value is forming the object of testing.

Into the load evaluating unit 18 an adjusted comparative load value sfs of changing-up, into the load evaluating unit 22 the adjusted comparative load value srs of short-circuiting are fed as programmes. These may correspond to the previously determined most adjusted comparative load values sfmin of changing-up, to the most adjusted comparative load value srmin of short-circuiting.

In a similar way as aforementioned, the gear change unit 20 gives a command signal for changing back.

These two simplified versions of the process remind of the earlier applied solutions to a certain extent. However, it seems to be better than those, as in sense of our invention basic conditions of gear change are examined on basis of load and optimal gear data.

Figure 13:
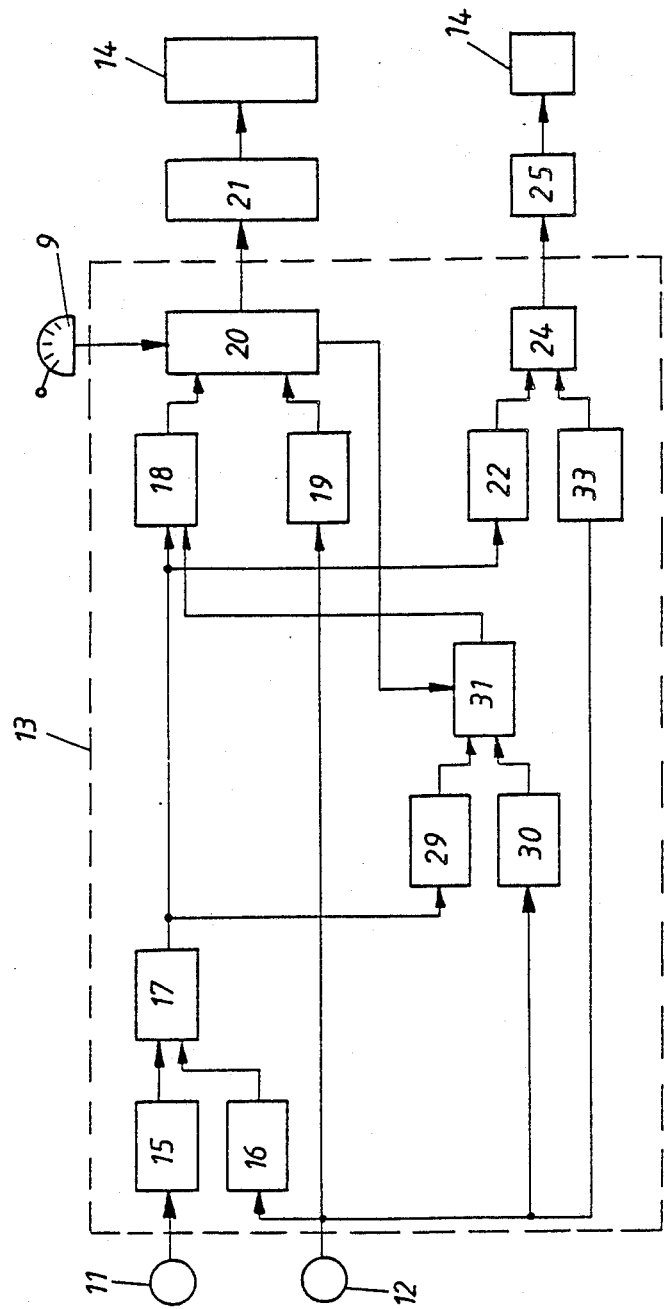

The block-schematic of a more complicated version of the process is to be seen if FIG. 13. Solution of normal situations in traffic used to be realized by applying the process as earlier described. With the gas-signal of the transmitter 11 indicating the position of the throttle pedal, the memory 15 selects the proper torque value from the diagram M/φ/, while with the r.p.m signal of the transmitter 12 the memory 16 selects the proper torque value from the diagram M/n/, from which the unit 17 generating the load signal generates the load signal s, which is compared in the load evaluating unit 18 with the comparative load value sf of changing-up and the comparative load value sv of changing-back.

In the r.p.m evaluating unit 19 the r.p.m signal is compared with the signal expressing the comparative r.p.m value nf of changing-up and the comparative r.p.m value nv of changing-back. Based on the result of comparison the load evaluating unit 18 and the r.p.m evaluating unit 19 release the proper signals, on basis of which the gear change control unit 20 gives a command signal through the power amplifier 21 to the electromagnetic valves 14 for shifting to the proper gear.

In the same way, the load evaluating unit 22 and the r.p.m evaluating unit 23 release a signal to the unit 24 controlling closing of the clutch 24. On basis of said signals the unit 24 releases a signal through the power amplifier 22 for short-circuiting or releasing the friction clutch 3.

Prior to specifying the modifications of conditions of gear change, let us consider the causes of changing-back to a lower gear and the changes in characteristics of the operative state leading to changing-back.

As already mentioned before, changing back may occur in three situations, namely normal deceleration, overtaking and ascent.

In course of normal deceleration gas-signal and revolutions per minute of the motor 1 are decreasing, however, as gas-signal decreases more intensively, (the more, it may drop to zero), load signal s will decrease too. That means that changing-back to the lower gear is caused by the reduction of the number of revolutions below the comparative value nv of changing-back. Now, if we examine the changes in characteristics, it can be seen well that by forming from the change of the number of revolutions an r.p.m change signal vn and by forming from the change of the load signal s a load change signal vs and interpreting the reduction of the characteristics as a negative change, in course of normal deceleration both signals vs (change in load) and vn (change in number of revolutions) will be negative.

In course of overtaking both gas-signal and r.p.m signal increase, but in consideration that the latter-mentioned may increase slower, the load signal s will increase. Due to the increased load signal s changing-back is taking place at a higher number of revolutions. Both signals, namely vn (change in r.p.m) and vs (change in load) will be positive.

In course of ascent gas-signal remains either unchanged or it increases, number of revolutions becomes less, accordingly, load signal s increases in this case too. Changing-back is taking place in this case too as a consequence of increased load signal s. The signal vn indicating change in r.p.m is negative, the signal vs indicating change in load will be positive.

State of characteristics prior to changing-back are summarized in the table below:

| Characteristics | changes | | |
| --- | --- | --- | --- |
| | normal deceleration | overtaking | ascent |
| r.p.m | below nv | over nv | over nv |
| vn | − | + | − |
| s | decreases | increases | increases |
| vs | − | + | + |

It can be seen well that if certain characteristics are examined by pairs, necessity of changing-back becomes unambigous. If similarly to the solutions having been applied up to now, we confine us to adjust the conditions of changing-up in one or two stages, by examining the changes in the characteristics as summarized above, adequate extent of adjustment can be chosen without any further information.

Accordingly, this version of the process is carried out in the following way:

Load signal s having been generated in the unit 17 is led into the unit 29 evaluating the change in load, wherein from the change in the unit of time a signal vs—indicating change in load—is formed. This signal is fed into the unit 31 generating the comparative load signal.

The r.p.m signal of the transmitter 12 is led to the unit 30 evaluating the change in r.p.m, and forms a signal vn relating to the change in r.p.m from the change taking place in the unit of time, which is also fed into the unit 31 generating the comparative load signal.

In the unit 31—forming the comparative load signal—with the command for shifting to a lower gear with the command signal of the gear change control unit 20 we examine the signs of the signal vn (change in r.p.m) and the signal vs (change in load) in the second of changing-back.

If both signals, namely vn and vs were negative, uniform travel or normal deceleration preceded changing-back, in this case the unit 31—forming the comparative load signal—leaves the conditions of changing-up the gear unaltered, that means that a correction value equalling to zero is forwarded to the load evaluating unit 18.

Now, if both signals, namely vn and vs were positive, changing-back was preceded by a considerable acceleration. In this case the unit 31 adjusts the comparative load signal of changing-up with a smaller correction value, and forms a constant comparative load value—i.e. the signal expressing it—for overtaking, in the loadevaluating unit 18.

At last, if the signal vn (change in r.p.m) was negative and the signal vs (change in load) was positive, changing-back results from travel on ascent. As a consequence, the unit 31—forming the comparative load signal—adjust the comparative load signal of changing-up with a higher correction value, and forms a signal expressing a constant comparative load value of ascent in the load evaluating unit 18.

With the autobus with the aforementioned characteristics conditions of changing-up or adjustment were determined experimentally in order to be able to carry out the process.

Normal comparative load value of changing-up amounts to 25%, comparative load value of overtaking to 18%, comparative load value of ascent to 6%. As it can be seen, these are essentially in compliance with the values having been determined for the earlier specified versions of the process.

This version of the process can be carried out without examining the change in load. In this case the task to examine the magnitude of the r.p.m signal of the transmitter 12 in the second of changing-back to a lower gear.

If the r.p.m signal was below the comparative r.p.m signal nv for changing-back and the signal vn indicating the changing in revolutions per minute was negative, the unit 31—forming the comparative load signal—evaluates it as a deceleration due to normal traffic conditions and does not change the comparative load value of changing-up having been programmed into the load evaluating unit 18.

If the r.p.m signal was higher than the former one, and the signal vn (indicating the change in the number of revolutions) was positive, the unit 31 considers it as a considerable acceleration and determines the previously described comparative load value of overtaking in the load evaluating unit 18.

In case if magnitude of the r.p.m corresponded to that of the previous one and the signal vn (change in r.p.m) was negative, the unit 31 evaluates this phenomenon as a travel in ascent, accordingly, it determines the comparative ascent load value for the load evaluating unit.

The aforementioned versions of processes can be further simplified so, as no difference is made between deceleration due to normal traffic situation and considerable acceleration. In this case to achieve "full extension of the motor" the driver has to supply fuel to an increased extent and for a longer time.

Figure 14:
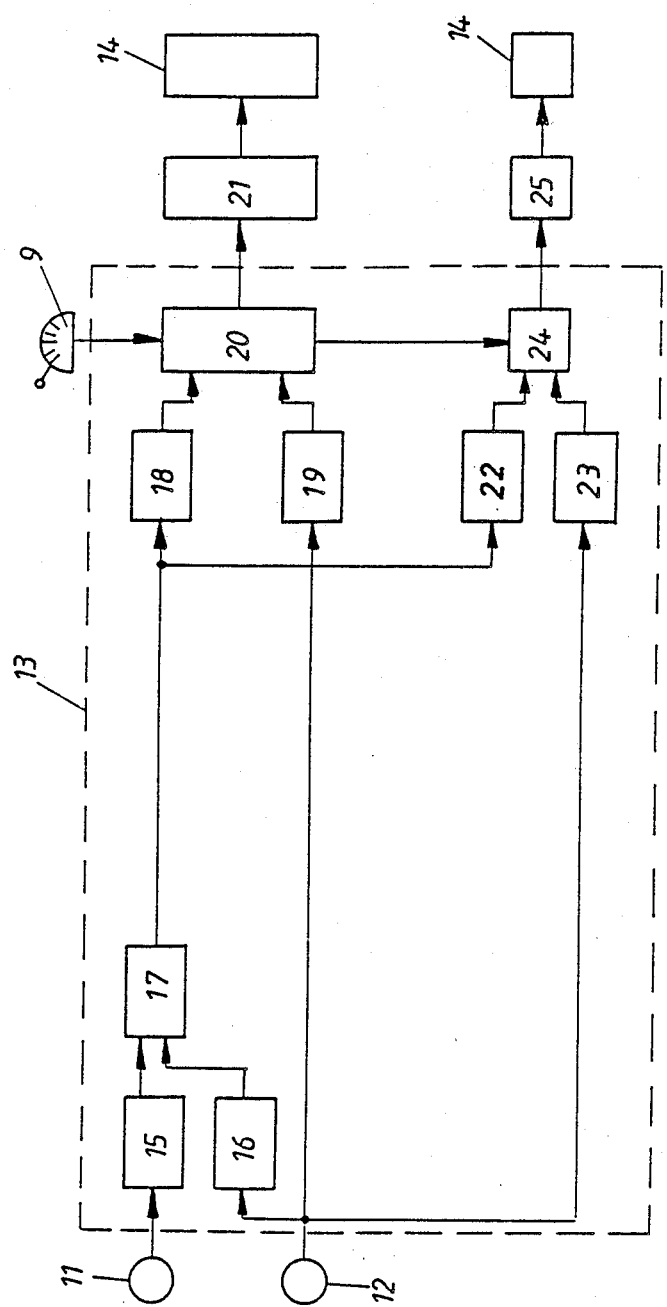

Another way for simplifying relates exclusively to the actuating of the friction clutch 3, however, it can be used with any versions of the process according to the invention. The most simple way of realization is shown in FIG. 14.

When describing the actuation of the friction clutch 3 we have already mentioned that by the proper selection of conditions of short-circuiting and shifting to a higher gear priority of changing-up can be assured. This can be realized in a different way too.

In we choose the same value for the comparative load value sf of changing-up and for the comparative load value sr of short-circuiting, however, with the commanding signal of the gear change unit 20 relating to shifting to a higher gear we give an inhibiting signal to the control unit controlling closing of the clutch. In such a manner if the conditions of changing-up are fulfilled, the control unit 24 cannot give the command signal for short-circuiting.

With the versions having been specified up to now we examined the number of revolutions of the motor 1 as one of the conditions of gear change. Earlier we mentioned that the outdrive shaft of the transmission is built together with the r.p.m signal transmitter 33, the signal of which is also forwarded to the control unit 13. Instead of the r.p.m of the motor 1 this number of revolutions can be examined too.

Figure 15:
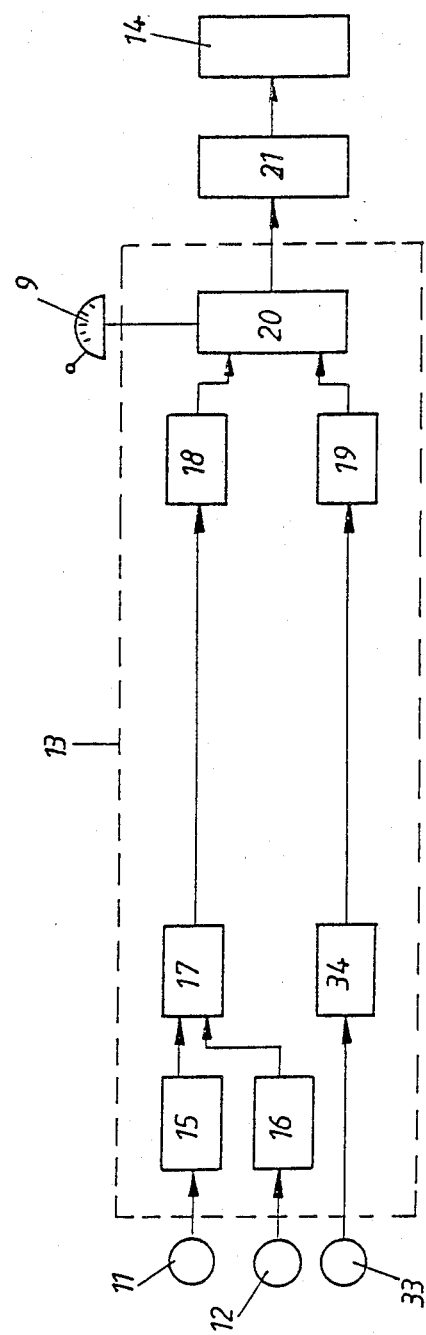

From the block-schematics in FIG. 15 it becomes obvious that number of revolutions of the motor 1, generated by the transmitter 12 is used only for determining the load value (s).

In consideration that the signal of the r.p.m signal transmitter 33 expresses the actual velocity and not the number of revolutions of the motor 1, therefore in the unit 34 for gear correction the signal is corrected in proportion to the prevailing shifter gear and generates the r.p.m signal of velocity nseb, which is led to the r.p.m evaluating unit 19, where it is compared with the r.p.m values as previously described. The advantage of this version lies in that the effect of the hydrodynamic torque converter is also considered. This version can be combined with all others.

For the versions of the process as described here for the sake of examples all the data relate to the motor serving here as an example and to an automatic transmission with an epicyclic gear; mainly, if the number of the stages is not four, conditions of gear change may be considerably different, accordingly, it seems to be expedient to determine the date experimentally.

We have to deal separately with those versions of the process, which serve for the control of synchronized mechanic transmissions.

In consideration that with these motor vehicles problem of asynchronism cannot be solved by superimposing the shifting of the single gears, another method is to be provided for.

As one of the methods control of synchronous position could be mentioned. As number of revolutions of the motor and number of revolutions of the output shaft of the transmission are continuously measured, by the simple comparison thereof synchronism can be controlled well. Synchronous position can be established e.g. by the slip of the clutch. Transmission can be cared for if gear changing forks are actuated by pneumatic cylinders. Otherwise, all the versions of the process can be realized with mechanized synchronized transmissions too.

When assembling the system for realizing the process according to the invention it is considered as advantageous that in the driving chain there is no hydrodynamic torque converter contained, accordingly conditions of short-circuiting need not be examined.

What we claim:

1. The process of controlling gear change in a vehicle having an engine and a transmission capable of automated shifting of gears, which comprises
   (a) establishing a first functional relationship between the torque available from the vehicle engine for various throttle positions and a second functional relationship between the torque available from the vehicle engine for various r.p.m. speeds thereof,
   (b) deriving a throttle signal representative of the throttle position of said vehicle,
   (c) comparing said throttle signal with said first functional relationship and generating a throttle/torque signal representing the available torque for said throttle position,
   (d) deriving an r.p.m. signal representative of the r.p.m. of the vehicle engine,
   (e) comparing said r.p.m. signal with said second functional relationship and generating an r.p.m./torque signal representing the available torque for said r.p.m. value,
   (f) comparing said throttle/torque and said r.p.m./torque signal to determine relative loading of said engine and to derive a loading signal representative of said loading,
   (g) continuously comparing said loading signal to first predetermined upshift and downshift comparative load level values,
   (h) continuously comparing said r.p.m. signal to first predetermined upshift and downshift comparative r.p.m. level values,
   (i) in response to a combination of (1) said loading signal being below the first predetermined upshift load level value and (2) said r.p.m. signal being above the first predetermined upshift r.p.m. level value, and (3) said transmission being in a gear below the highest, effecting an upshift of said transmission, and
   (j) in response to either (1) said loading signal exceeding the first predetermined downshift load level value or (2) said r.p.m. signal being below the first predetermined downshift r.p.m. level value, in combination with said transmission being in a gear above the lowest, effecting a downshift of said transmission.

2. A process according to claim 1, wherein the automatic transmission includes a hydrodynamic torque converter and a clutch for by-passing said torque converter, further characterized by,
   (a) storing in a memory function a second predetermined comparative load value and a second predetermined comparative r.p.m. value for engagement of said clutch,
   (b) continuously comparing said second predetermined load value and said second predetermined r.p.m. value with said r.p.m. signal and said loading signal,
   (c) in response to (1) said loading signal being below said second predetermined load value and (2) said r.p.m. signal being higher than said predetermined r.p.m. value, conditioning said clutch to by-pass said hydrodynamic torque converter, and
   (d) in response to the r.p.m. signal dropping below said second predetermined r.p.m. value, conditioning said clutch to enable normal operation of said hydrodynamic torque converter.

3. A process according to claim 1, further characterized by,
   (a) upon load and r.p.m. signals initiating a downshifting of the transmission, storing the momentary value of the r.p.m. signal at the time of said downshifting,
   (b) adjusting downward one or both of the first and second predetermined load values as a function of said stored r.p.m. signal related to a reference r.p.m. value, whereby subsequent upshifting and/or by-passing is delayed as a function of said downward adjustment.

4. A process according to claim 1, further characterized by,
   (a) upon load and r.p.m. signals initiating a downshifting of the transmission, storing the momentary value of the r.p.m. signal at the time of said downshifting,
   (b) adjusting upward one or both of the first and second predetermined r.p.m. values as a function of said stored r.p.m. signal related to a reference r.p.m. value, whereby subsequent upshifting and/or by-passing is delayed as a function of said downward adjustment.

5. A process according to claim 1, further characterized by,
(a) sensing the rate of change of r.p.m. and load at the time of downshifting said transmission,
(b) adjusting one or both of the first predetermined load value for upshifting and the first predetermined r.p.m. value for upshifting as a function of the rates of change sensed,
(c) the direction of such adjustment being such as to reduce the comparative load level and or increase the comparative r.p.m. level at which a subsequent upshift is initiated.

6. A process according to claim 5, further characterized by,
(a) when the rates of change of load and r.p.m. are negative, indicating the need for downshifting as a function of normal deceleration of the vehicle, the least amount of adjustment is effected,
(b) when the rate of change of load and r.p.m. are positive, indicating the need for downshifting as a function of acceleration of the vehicle for overtaking, a greater amount of adjustment for delay is effected, and
(c) when the rate of change of load is positive and the rate of change of r.p.m. is negative, indicating the need for downshifting as a function of ascent, a still greater amount of adjustment for delay is effected.

* * * * *